(12) United States Patent
Keefe (10) Patent No.: US 9,038,677 B2
(45) Date of Patent: May 26, 2015

(54) COMBINATION SCOOP AND FUNNEL

(71) Applicant: Tyler Keefe, Huntington Beach, CA (US)

(72) Inventor: Tyler Keefe, Huntington Beach, CA (US)

( * ) Notice: Subject to any disclaimer, the term of this patent is extended or adjusted under 35 U.S.C. 154(b) by 202 days.

(21) Appl. No.: 13/654,900

(22) Filed: Oct. 18, 2012

(65) Prior Publication Data

US 2014/0110019 A1    Apr. 24, 2014

Related U.S. Application Data (60) Provisional application No. 61/627,782, filed on Oct. 18, 2011.

(51) Int. Cl.

| | | |
|---|---|---|
| *B65B 1/04* | (2006.01) |
| *A47J 43/28* | (2006.01) |
| *A47J 31/40* | (2006.01) |
| *B67C 11/06* | (2006.01) |
| *B65B 39/00* | (2006.01) |
| *G01F 11/02* | (2006.01) |

(52) U.S. Cl.
CPC .............. *A47J 43/28* (2013.01); *B67C 11/06* (2013.01); *B65B 39/007* (2013.01); *G01F 11/02* (2013.01); *A47J 31/404* (2013.01); *A47J 2203/00* (2013.01)

(58) Field of Classification Search
CPC ...... B65B 39/007; B67C 11/00; B67C 11/06; B67C 11/063; B67C 2011/00; B67C 2011/20; B67C 11/02; G01F 19/02
USPC ............... 141/98, 108, 109, 319, 331–345, 141/363–366; 294/55; 222/461
See application file for complete search history.

(56) References Cited

U.S. PATENT DOCUMENTS 2,868,246 A * 1/1959 Nelson .......................... 141/286
6,035,907 A * 3/2000 DeCoster ...................... 141/331

* cited by examiner

*Primary Examiner* — Jason K Niesz
(74) *Attorney, Agent, or Firm* — Roy A. Ekstrand (57) ABSTRACT

A combination scoop and funnel apparatus provides a scoop portion defining a dry material reservoir having an open top and a downwardly tapered conical bottom portion which terminates in a discharge aperture. A handle is joined to the scoop reservoir. A movable frusto-conical funnel member defines a funnel aperture at its lower end and an open top at its upper end. The funnel member supports a valve slide which extends upwardly through the discharge aperture and further supports a valve cap on the upper end thereof. The valve member is movable between a downwardly extending valve closed configuration and an upwardly positioned valve open configuration.

10 Claims, 7 Drawing Sheets

Fig 11 ure and a lowered position in which the valve cap covers and closes the discharge aperture.

COMBINATION SCOOP AND FUNNEL

CROSS-REFERENCE TO RELATED APPLICATION

This application claims the benefit of and priority under 35 U.S.C. 119(e) of U.S. Provisional Patent Application No. 61/627,782, entitled COMBINATION SCOOP AND FUNNEL, filed Oct. 18, 2011 in the name of Tyler Keefe, the disclosure of which is incorporated herein by reference.

FIELD OF THE INVENTION

This invention relates generally to powder or granular dry material and mixing same with a liquid to form a beverage and relates particularly to apparatus and method for measuring an energy and nutrition supplement dry mix and for adding the measured dry material to a quantity of water or other liquid within a water bottle.

BACKGROUND OF THE INVENTION

One of the more common practices utilized in providing beverages of different types involves the combination of a quantity of liquid with a measured quantity of dry material such as powder or granular material. Various dry materials are used in this manner to provide a variety of beverages. Most dry materials used in this manner are soluble within the liquid for ease of combination. While the liquid used may include milk, juice or the like, by far the most commonly used liquid in forming beverages in this manner is plain water. In many beverages, the amount of dry material must be measured prior to combination with the liquid. Toward this end, many manufacturers and suppliers of dry powder or granular additives or supplements provide a "pre-measured" scoop within the supplement packaging to aid the user in measuring a correct amount. The actual addition of the dry material to the liquid can become problematic or downright messy as the dry material may spill or in part miss the liquid container. Additionally, such dry materials often tend to collect within the measuring scoop only to fall from the measuring scoop abruptly causing splashing of the liquid. When the liquid vessel used is an open top glass or cup, the typical measuring scoop may, despite the above problems, suffice. If however the liquid vessel is a bottle having a narrow or small diameter neck, a funnel will most likely be required to successfully transfer the measured dry material into the liquid filled bottle. One very common scenario encountered in the creation of beverages in this manner involves the use by athletes or other fitness conscious persons utilizing dry material supplements and water mixing beverages derived therefrom for energy enhance elements as well as vital elements such as electrolytes in connection with strenuous workouts. For convenience, such fitness participants usually prefer to add their dry powder material supplements directly into an otherwise conventional narrow-necked water bottle. Once the desired quantity of dry supplement material has been transferred to the water bottle, the bottle cap is replaced and the contents are shaken to dissolve the dry supplement material in the water and form the desired beverage. The mixed beverages is then ready to go and convenient for use in a workout environment.

Unfortunately, the use of a measuring scoop and funnel in the exercise and workout environment here-to-fore necessary to accommodate a typical narrow-necked water bottle is extremely inconvenient and often messy. In some instances, practitioners have attempted to meet this need utilizing paper fabricated disposable funnels or carefully rolled and folded sheets of paper as a substitute for conventional funnels. All of this has proven to be very unsatisfactory and inconvenient.

Because of the practice of using a conventional narrow-necked water bottle for combining supplement powders and other additives to water has substantial preference among athletes and fitness buffs, there arises a continuing need in the art for a more efficient, simple and effective apparatus and method to effectuate this process.

SUMMARY OF THE INVENTION

The present invention apparatus and method meets and solves this continuing need in the art by providing a combination measuring scoop and integral funnel. The measuring scoop includes an open top reservoir portion having a handle grip joined thereto. The reservoir portion includes a downwardly tapered lower portion which terminates in a discharge aperture at its bottom end. A tapered funnel member conforms generally to the tapered lowered portion of the reservoir and defines an inverted frusto-conical member having an open top and a bottom funnel aperture. A valve slide is joined to the interior of the funnel member and forms an upwardly extending open material pervious structure that passes through the discharge aperture and extends into the reservoir interior. The upper end of the valve slide within the reservoir interior further supports a valve cap larger in size than the discharged aperture of the reservoir member. The tapered funnel member is supported by the valve slide and is movable with respect to the scoop reservoir between a downwardly extending closed position in which the cap covers and closes the discharge aperture and a raised open position in which the cap is raised from the closed position opening the discharge aperture and allowing dry material within the reservoir to pass downwardly through spaces formed in the previous valve slide. The downwardly flowing material flows through the spaces in the valve slide and downwardly through the discharge aperture into to funnel member. Thereafter the dry material continues downwardly through the funnel aperture and into a waiting water bottle.

In use, the user moves the funnel and valve slide to the lower position to close the cap over the discharge aperture and securely close the reservoir of the scoop portion. The user than grips the scoop handle and scoops the desired quantity of dry material into the reservoir. The quantity is measured using a plurality of graduations and markers supported on the exterior surface of the dry material reservoir exterior. The user then positions the scoop over the neck of a water bottle and exerts a slight pressure upon the funnel portion against the top of the bottle neck. In response, the funnel member and valve slide move upwardly into the reservoir to open the discharge aperture allowing the dry material to flow downwardly through the valve slide spaces, the discharge aperture, and the funnel aperture into the bottle neck. The bottle is then capped and shaken to mix the supplement beverage.

In accordance with the present invention, there is provided a combination scoop and funnel comprising: a scoop having a material body defining an open top, an interior material reservoir and a narrowing portion extending downwardly from the material body and defining a discharge aperture; a funnel member having a tapered body, an open top and a funnel aperture; a valve slide having a lower end joined to the funnel member and an upper end extending through the discharge aperture; and a valve cap, defining a maximum dimension greater than the discharge aperture, supported upon the upper end of the valve slide above the discharge aperture, the slide being movable between a raised position in which the valve cap is raised upwardly away from the discharge aperture and the funnel member is proximate to the narrowing portion and a lowered position in which the valve cap blocks and closes the discharge aperture and the funnel member is spaced from the narrowing portion, the slide moved to the lowered position closing the discharge aperture to retain material scooped into the interior material reservoir and thereafter raised to open the discharge aperture and allow material to fall through the discharge aperture and the funnel aperture.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

By way of overview, the present invention combination scoop and funnel apparatus provides a scoop portion defining a dry material reservoir having an open top and a downwardly tapered conical bottom portion which terminates in a discharge aperture. A handle is joined to the scoop reservoir. A movable frustro-conical funnel member defines a funnel aperture at its lower end and an open top at its upper end. The funnel member supports a valve slide which extends upwardly through the discharge aperture and further supports a valve cap on the upper end thereof. The valve member is movable between a downwardly extending valve closed configuration and an upwardly positioned valve open configuration. The user is able to position the valve member in the valve closed position and thereafter utilize the scoop apparatus in a scooping action within the dry material to deposit a quantity of material within the dry material reservoir. The amount of material may be measured against a plurality of graduations supported on the exterior of the reservoir. Once the desired quantity of material has been scooped into the reservoir, the user simply positions the funnel aperture atop the open neck of a water bottle and with gentle downward pressure forces the funnel member upwardly against the frustro-conical surface of the scoop portion to open the dry material valve and allow the measured dry material to flow downwardly into the water bottle. Once the desired quantity of dry material has been transferred to the water bottle, it is capped and may be shaken vigorously to dissolve the dry material and complete the supplement beverage.

Figure 1:
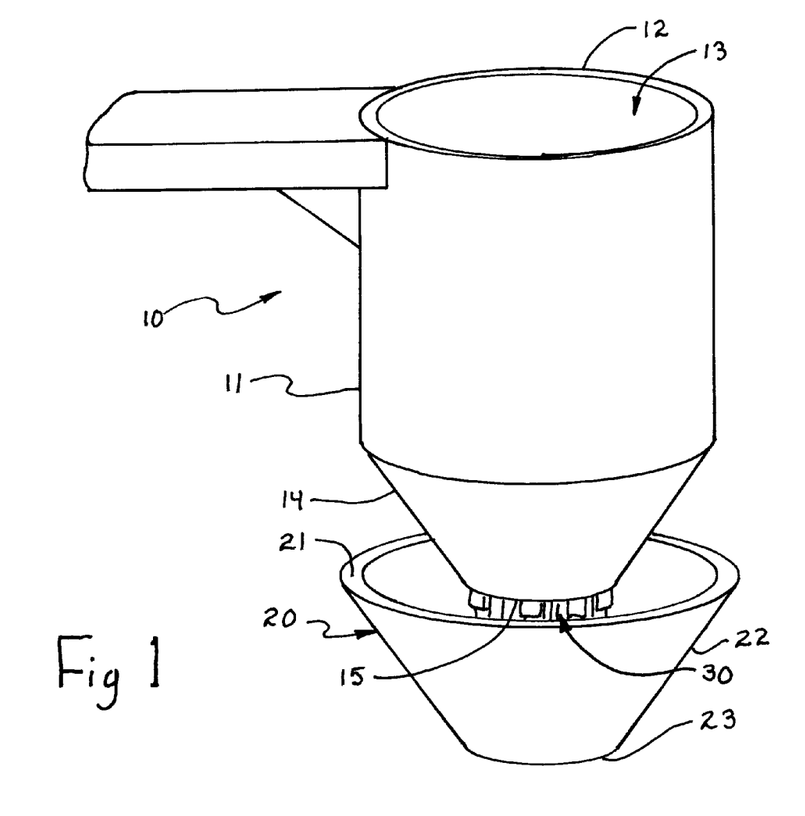
FIG. 1 sets forth a side perspective view of a combination scoop and funnel apparatus constructed in accordance with the present invention.

More specifically, FIG. 1 sets forth a side perspective view of a combination scoop and funnel constructed in accordance with the present invention and generally referenced by numeral 10. Combination scoop and funnel 10 includes a generally cylindrical material reservoir 11 having an extending handle 16 joined thereto. Material reservoir 11 further includes a frusto-conical portion 14 tapering downwardly from the bottom end of the cylindrical portion of material reservoir 11. Frustro-conical portion 14 terminates in a discharge aperture 15. Material reservoir 11 defines an open top 12 and an interior 13.

Combination scoop and funnel 10 further includes a tapered funnel member 20 defining an open top 21 and a funnel aperture 23 together with a tapered side 22 extending therebetween. A valve slide 30, the structure of which is set forth below in FIGS. 3 and 4 in greater detail is joined to the lower interior portion of funnel member 20 and extends upwardly through discharge aperture 15. While the structure of valve slide 30 is set forth below in greater detail, suffice it to note here that valve slide 30 movably supports funnel member 20 with respect to material reservoir 11. In the configuration shown in FIG. 1, funnel member 20 occupies its extended position which, as is described below in greater detail, corresponds to the closed valve configuration of combination scoop and funnel 10.

It will be recognized that combination scoop and funnel 10 may be fabricated using a variety of materials. It has been found particularly advantageous to fabricate combinations scoop and funnel 10 using molded plastic components for low-cost high-volume production. However, other materials may be utilized. It has also been found that the various components of combination scoop and funnel 10 may be fabricated utilizing either opaque materials or clear transparent materials as desired. It has been found that transparent material often provides a convenience in that the quantity of powders scooped into reservoir 11 may be easily referenced to quantity graduations (seen in FIG. 5). In the configuration shown in FIG. 1, funnel member having been moved downwardly to its extended position configures combination scoop and funnel 10 for use in scooping up a quantity of dry material from a container in a similar fashion to that exercised with more conventional scoops. In accordance with an important aspect of the present invention described below in FIG. 3, the position of funnel member 20 as shown maintains closure of the internal valve (also seen in FIG. 3) within reservoir 11 to maintain the quantity of scooped dry material within reservoir 11.

Figure 2:
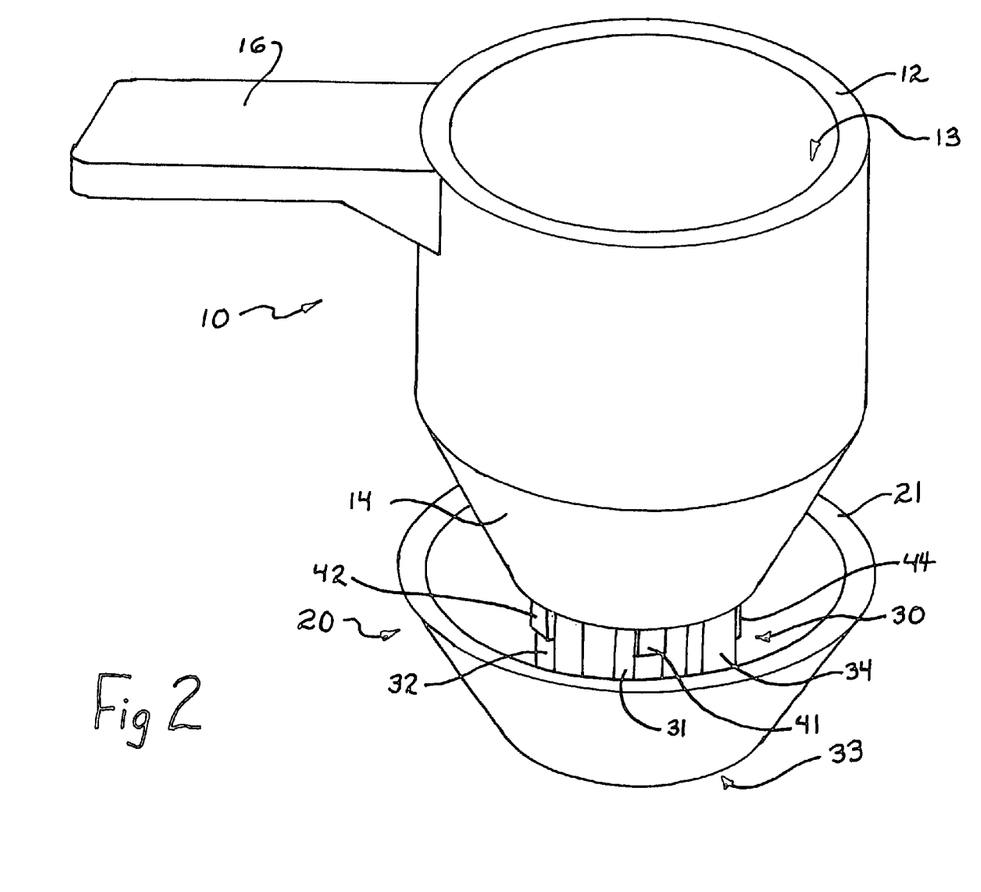
FIG. 2 sets forth a top perspective view of the present invention combination scoop and funnel apparatus.
Figure 3:
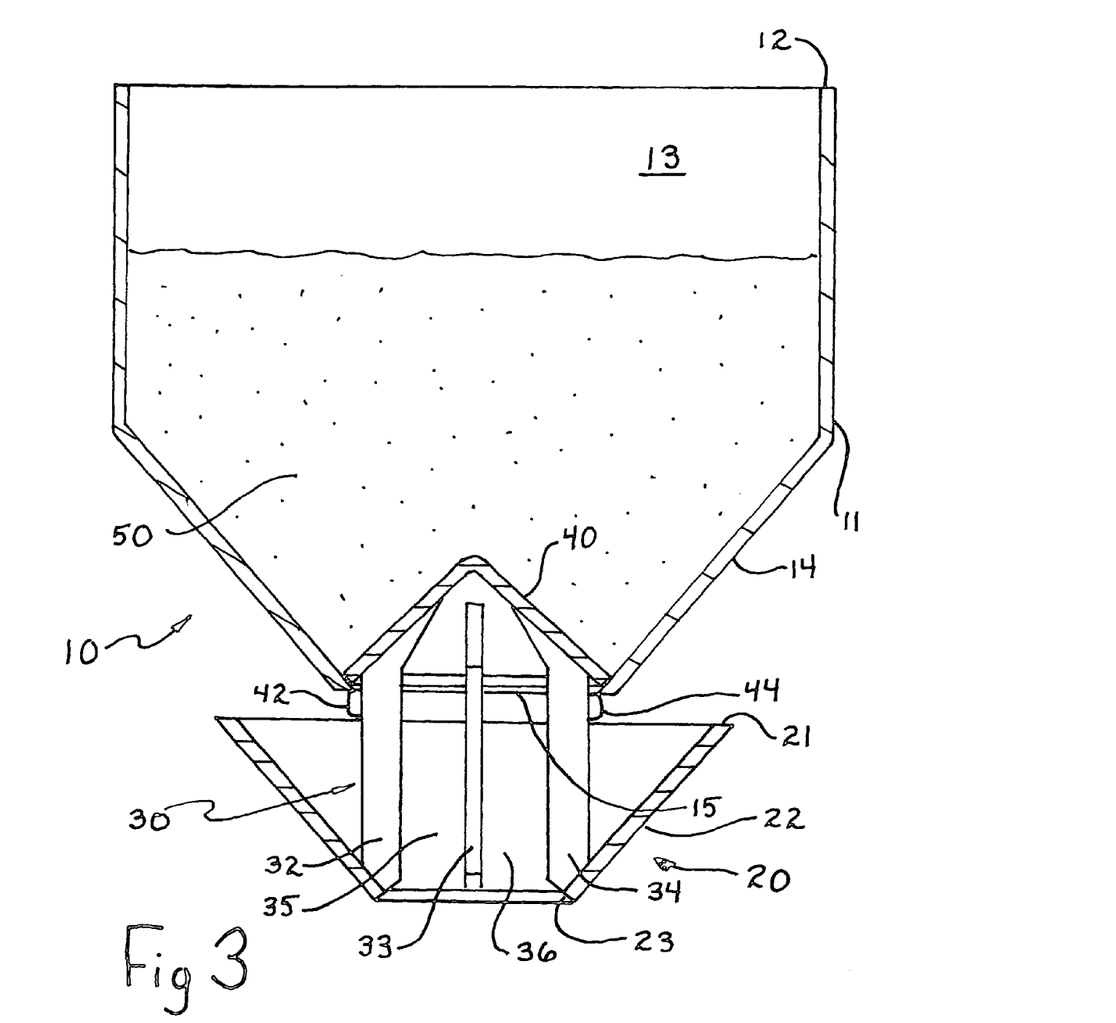
FIG. 3 sets forth a section view of the present invention combination scoop and funnel apparatus having the funnel member moved to the valve closed configuration.

FIG. 2 sets forth a top perspective view of combination scoop and funnel 10 also showing funnel member 20 in the extended configuration which maintains valve closure (seen in FIG. 3). As described above, combination scoop and funnel 10 includes a generally cylindrical material reservoir 11 having an open top 12 and a reservoir interior 13. As is also described above, material reservoir 11 includes a downwardly extending frusto-conical portion 14. A handle 16 is secured to material reservoir 11. A funnel member 20 is supported by a valve slide 30 beneath tapered portion 14. As will be described below in greater detail, valve slide 30 includes a plurality of generally planar vertically extending vanes 31 through 34 (vanes 32 through 34 shown in FIG. 3) each of which is joined at their respective lower ends to the interior surface of funnel member 20 and each of which extends upwardly through discharge aperture 15 of tapered portion 14. The structure of valve slide 30 further includes a plurality of spaces 35, 36, 37 and 38 formed between vanes 31 through 34. Space 37 formed between vanes 31 and 32 together with space 38 form between vanes 31 and 34 are seen in FIG. 2 while space 35 formed between vanes 32 and 33 and space 36 formed between vanes 33 and 34 are seen in FIG. 3. The function of valve slide 30 provides a slidable support for funnel member 20 with respect to tapered portion 14 of material reservoir 11. In addition, the upper end of valve slide 30 further supports a valve cap 40 (seen in FIGS. 3 and 4) within interior 13 of reservoir 11.

Figure 4:
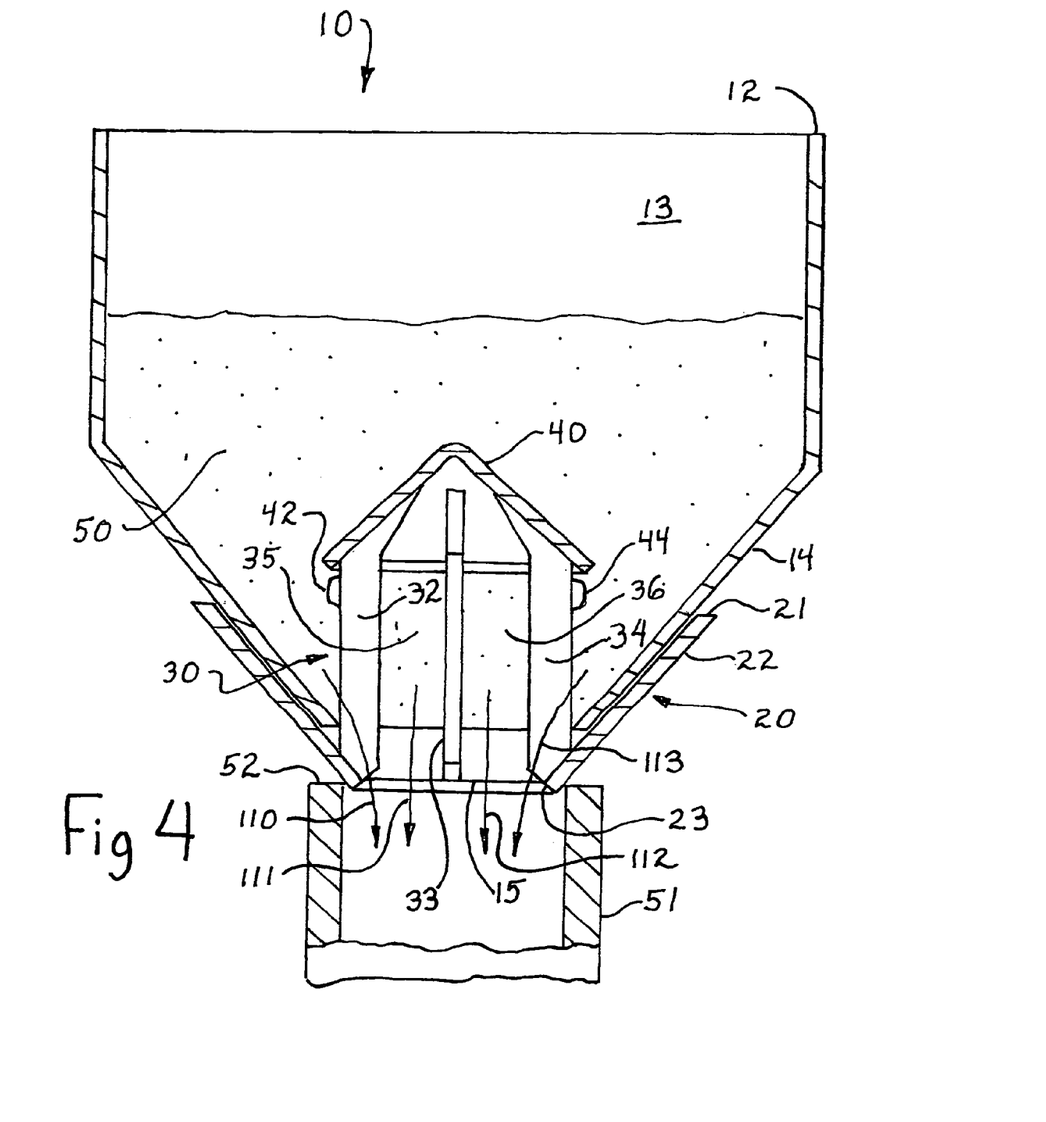
FIG. 4 sets forth a section view of the present invention combination scoop and funnel apparatus having the funnel member moved to the open valve configuration.

In the embodiment of the present invention shown in FIGS. 1 and 2, valve slide 30 further includes a plurality of detent projections on each of vanes 31 through 34. The function of detent projections such as detent projections 41 and 42 shown on vanes 31 and 32 respectively in FIG. 2 provides a slight locking of valve slide 30 in the extended position shown in FIGS. 1 and 2. This slight locking action is illustrated in FIGS. 3 and 4 below. Suffice it note here that the interaction of the detent projections supported upon the vanes of valve slide 30 against discharge aperture 15 of tapered portion 14 tends to maintain the closure of valve slide 30. It will also be noted that this slight locking action is easily overcome by a slight downward pressure upon handle 16 forcing funnel member 20 upwardly and flexing the vanes of valve slide 30 inwardly a sufficient amount to release the locking action and allow valve slide 30 to move upwardly through discharge aperture 15.

It is recognized that the detent projections supported upon vanes 31 through 34 may be omitted and a simple friction fit between vanes 31 through 34 within discharge aperture 15 may be used to maintain closure of the valve within reservoir 11.

FIG. 3 sets forth a section view of combination scoop and funnel 10. As will be seen, the section view of FIG. 3 shows funnel member 20 in its downwardly extended position which corresponds to the closed valve configuration of combination scoop and funnel 10. It will be recognized that in this closed valve configuration a quantity of dry material 50 may be supported securely within the material reservoir.

More specifically, combination scoop and funnel 10 includes a generally cylindrical material reservoir 11 having an open top 12 and a tapered portion 14. Tapered portion 14 terminates at its bottom end in a discharge aperture 15. Combination scoop and funnel 10 further includes a funnel member 20 having a tapered side 22, an open top 21 and a funnel aperture 23 formed therein. Funnel member 20 further supports a valve slide 30 formed of a plurality of upwardly extending generally planar vanes 31 through 34 (vane 31 seen in FIG. 2). Veins 31 through 34 define respective lower ends joined to the interior surface of funnel member 20 and are evenly spaced about funnel aperture 23. Veins 31 through 34 extend upwardly through discharge aperture 15 and define respective upper ends which in turn support a valve cap 40. Valve cap 40 is sized to be slightly larger than discharge aperture 15. Veins 31 through 34 define a plurality of spaces between each vane such as space 35 formed between vanes 32 and 33 and space 36 formed between vanes 33 and 34. Veins 31 through 34 each define a detent projection such as projection 42 extending from vane 32 and projection 44 extending from vane 34.

As mentioned above, FIG. 3 shows a section view of combination scoop and funnel 10 in the valve closed configuration. As is also mentioned above, this configuration corresponds to having funnel member 20 drawn downwardly from material reservoir 11 to its extended configuration characterized by a separation between funnel member 20 and tapered portion 14. In this valve closed configuration, valve cap 40 is positioned upon and above discharge aperture 15 providing closure of discharge aperture 15. Detent projections such as detent projections 42 and 44 engage the lower edge of tapered portion 14 and maintain a slight locking force upon valve slide 30 which secures valve cap 40 in the position shown in FIG. 3. With valve cap 40 maintaining closure of discharge aperture 15, the user is able to scoop the desired quantity of dry material 50 into reservoir interior 13. With the desired quantity of dry material 50 captivated within reservoir interior 13, the user may handle combination scoop and funnel 10 without concern for spilling material 50. The user then moves combination scoop and funnel 10 to align funnel aperture 23 of funnel member 20 above the upper edge of the target bottle in the manner shown in FIG. 4.

FIG. 4 sets forth the section view of FIG. 3 showing funnel member 20 in its upward position corresponding to the valve open configuration of combination scoop and funnel 10. It will be apparent from comparison of FIGS. 3 and 4 that the upward movement of funnel member 20 to general overlap and alignment with tapered portion 14 of reservoir 11 moves valve slide 30 and valve cap 40 upwardly into interior reservoir 13.

More specifically, combination scoop and funnel 10 includes a generally cylindrical material reservoir 11 having an open top 12 and a tapered portion 14. Tapered portion 14 terminates at its bottom end in a discharge aperture 15. Combination scoop and funnel 10 further includes a funnel member 20 having a tapered side 22, an open top 21 and a funnel aperture 23 formed therein. Funnel member 20 further supports a valve slide 30 formed of a plurality of upwardly extending generally planar vanes 31 through 34 (vane 31 seen in FIG. 2). Veins 31 through 34 define respective lower ends joined to the interior surface of funnel member 20 and are evenly spaced about funnel aperture 23. Veins 31 through 34 extend upwardly through discharge aperture 15 and define respective upper ends which in turn support a valve cap 40. Valve cap 40 is sized to be slightly larger than discharge aperture 15. Veins 31 through 34 define a plurality of spaces between each vane such as space 35 formed between vanes 32 and 33 and space 36 formed between vanes 33 and 34. Veins 31 through 34 each define a detent projection such as projection 42 extending from vane 32 and projection 44 extending from vane 34.

With funnel member 20 and valve slide 30 in the raised configuration shown in FIG. 4, valve cap 40 is withdrawn from discharge aperture 15 allowing dry material 50 to flow downwardly through the plurality of spaces between vanes 31 through 34 as indicated by arrows 110 through 113. As mentioned above, the user aligns funnel member 20 with upper edge 52 of the target bottle neck 51 prior to forcing funnel member 20 upwardly to open the closure of valve cap 40 against discharge aperture 15. With this alignment maintained, FIG. 4 shows the result of the user overcoming the slight locking action of detent projections upon each of vanes 31 through 34 and forcing funnel member 20 upwardly against tapered portion 14 of reservoir 11. Because of the ample spaces formed between vanes 31 through 34, dry material 50 readily flows downwardly from reservoir interior 13 through the vane spaces and discharge aperture 15. The dry material continues flowing downwardly through funnel aperture 23 into bottle neck 51 and downwardly into the liquid supported therein (not shown). Once the entire quantity of dry material 50 has flowed from reservoir interior 13 into the bottle interior, the user then withdraws funnel member 20 downwardly from reservoir 11 to restore the funnel member and valve slide to the closed configuration shown in FIG. 3. Combination scoop and funnel 10 is then ready for the next use.

Figure 5:
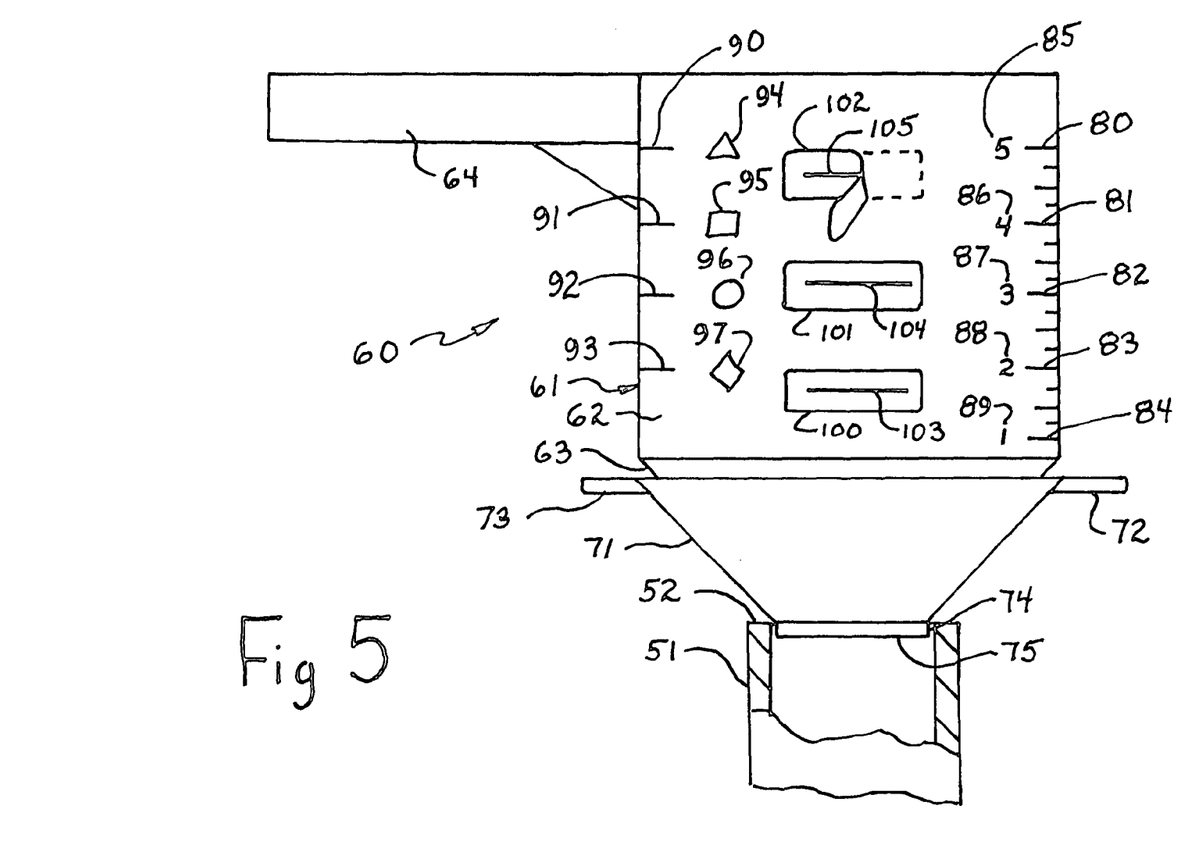
FIG. 5 sets forth a side elevation view of an alternate embodiment of the present invention combination scoop and funnel apparatus having the funnel member thereof moved to the valve open configuration.

FIG. 5 sets forth an alternate embodiment of the present invention combination scoop and funnel generally referenced by numeral 60. For the most part that it will be apparent that combination scoop and funnel 60 conforms substantially to the above-described embodiment with the primary functional differences being found in locating rim 74 and grip tabs 72 and 73. Combination scoop and funnel 60 also is illustrative of a variety of material quantity graduations or references which are supported upon the exterior surface of the material reservoir in order to facilitate appropriate measurement of the dry material to be transferred.

More specifically, combination scoop and funnel 60 includes a generally cylindrical reservoir 61 having an outer cylindrical wall 62 and a frustro-conical tapered portion 63. Combination scoop and funnel 60 further includes a handle 64 and a funnel member 70. Funnel member 70 and material reservoir 61 are substantially identical to material reservoir 11 and funnel member 20 set forth above. Funnel member 70 further includes a pair of outwardly extending grip tabs 72 and 73 which are useful as an aid in moving funnel member 70 downwardly to the valve closed extended configuration shown above in FIG. 3. Locating rim 74 formed on the bottom edge of tapered portion 71 aids the user in locating and positioning combination scoop and funnel 60 within a conventional bottle neck 51 upon upper edge 52 thereof.

A plurality of measurement graduations 80 through 84 are formed on outer wall 62 together with a corresponding plurality of numeric indicia 85 through 89. These provide conventional quantity measurement graduations. In addition, outer wall 62 supports a further plurality of quantity graduations 90 through 93 each having an associated indicia icon 94 through 97. By way of example and not limitation, indicia icons 94 through 97 may for example be icons indicative in particular brands of dry material to be used in a particular quantity. Finally, outer wall 62 further supports a plurality of custom quantity markers 100, 101 and 102. Markers 101 through 102 include quantity indicia 103 through 105 respectively. In the preferred fabrication of the embodiment of the invention shown in FIG. 5, custom markers 100 through 102 are formed in a stick on label configuration allowing them to be positioned upon a desired portion of outer wall 62. For purposed of illustration, custom marker 102 is shown being positioned upon outer wall 62. The use of custom markers 100 through 102 allows the user to customize a plurality of quantity indicia upon outer wall 62 corresponding to the users preferences.

Figure 6:
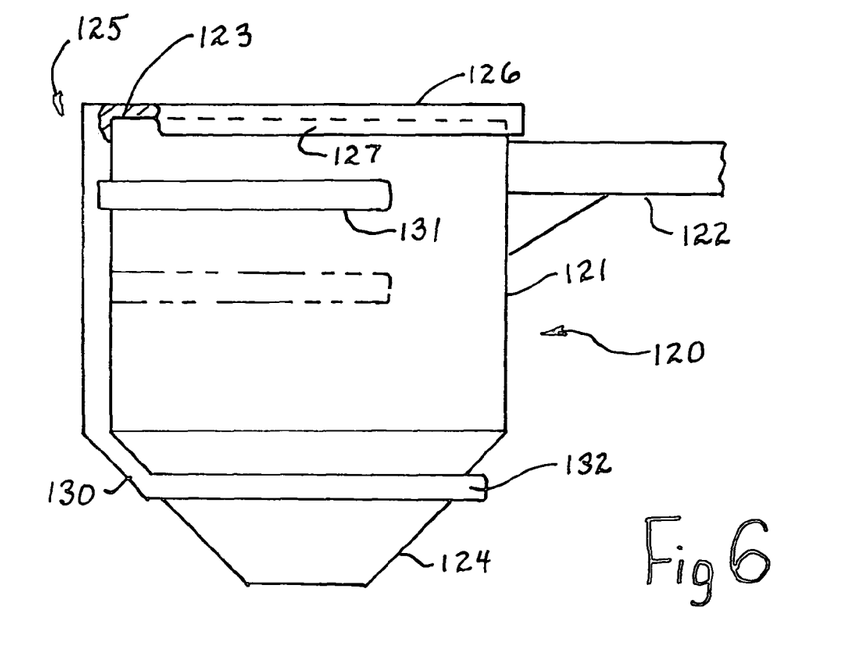
FIG. 6 sets forth a side perspective view of a combination scoop and funnel apparatus constructed in accordance with the present invention having a snap-fit capping apparatus secured thereto.

FIG. 6 sets forth a side elevation view of a combination funnel and scoop constructed in accordance with the present invention and generally referenced by the numeral 120. Combination funnel and scoop 120 is shown having a cap lock 125 secured thereto. Cap lock 125 includes a cap 126 preferably formed of a resilient plastic material and having a downwardly extending snap rim 127. Cap 126 is snap fitted to upper edge 123 of material body 121 of combination scoop and funnel 125. Cap 126 provides closure of material body 121 and is joined to the upper end of spine 130. Spine 130 extends downwardly along material body 121 and is maintained in place by a clasp 131. The lower end of spine 130 supports a lock pin 132. Lock pin 132 passes between the upper edge of funnel member 124 and the lower edge of material body 121. Thus, lock pin 132 secures funnel member in its lowered position providing closure of material body 121. Concurrently, cap 126 is snapped upon upper edge 123 to complete the captivation of material (not shown) within combination scoop and funnel 120. Cap lock 125 is removed by pulling cap 126 upwardly and drawing clasp 131 and lock pin 132 from material body 121.

Figure 7:
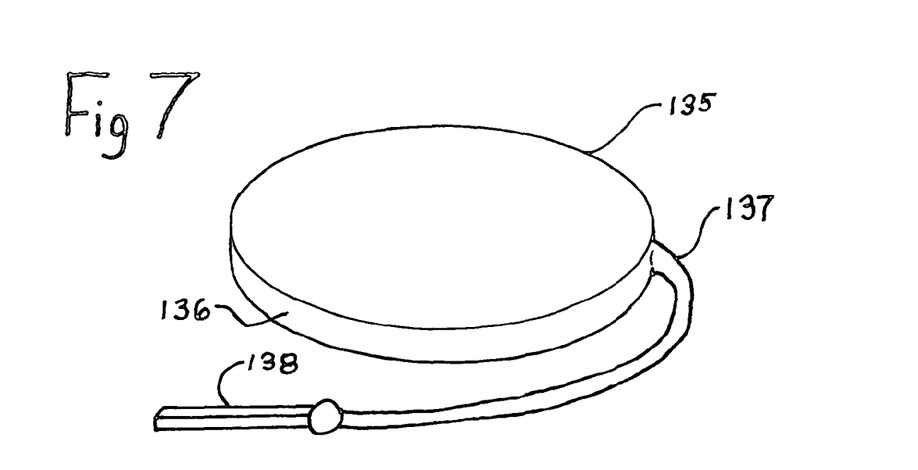
FIG. 7 sets forth an alternate embodiment capping apparatus for use in combination with the present invention combination scoop and funnel apparatus.

FIG. 7 sets forth an alternate capping apparatus for use in closing a combination scoop and funnel such as combination scoop and funnel 120 shown in FIG. 6 having a cap 135 defining a downwardly extending snap rim 136. A lock pin 138 is connected to cap 135 by a tether 137. In operation, cap 135 is snapped upon the upper edge of a material body (such as material body 121 shown in FIG. 6) after which lock pin 138 is inserted between the funnel member and the material body.

Figure 8:
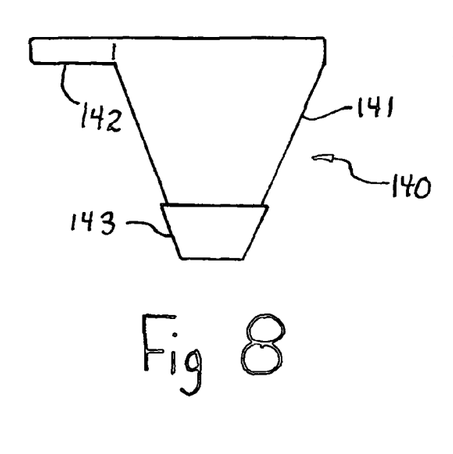
FIG. 8 sets forth a side elevation view of an alternate embodiment of the present invention combination scoop and funnel apparatus having a generally frusto-conical material body.

FIG. 8 sets a side elevation view of a further alternate embodiment combination scoop and funnel generally referenced by numeral 140. Combination scoop and funnel 140 includes a material body 141 having a handle 142 extending therefrom. Combination scoop and funnel 140 is constructed in accordance with the above-described apparatus and functions in accordance therewith. Thus, combination scoop and funnel 140 includes a funnel member 143. Combination scoop and funnel 140 differs from the above-described embodiments in that material body 141 is generally frusto-conical in shape.

Figure 9:
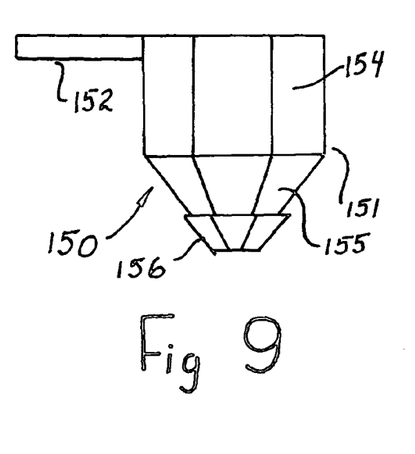
FIG. 9 sets forth a side elevation view of a further alternate embodiment of the present invention combination scoop and funnel apparatus having a generally faceted material body.

FIG. 9 sets a side elevation view of a further alternate embodiment combination scoop and funnel generally referenced by numeral 150. Combination scoop and funnel 150 includes a material body 151 having a handle 152 extending therefrom. Combination scoop and funnel 150 is constructed in accordance with the above-described apparatus and functions in accordance therewith. Thus, combination scoop and funnel 150 includes a funnel member 153. Combination scoop and funnel 150 differs from the above-described embodiments in that material body 151 is shaped to define a plurality of generally planar facets. Thus, material body 151 is formed of rectangular facets 154 together with trapezoidal facets 155. Correspondingly, funnel member 153 is formed of trapezoidal facets 156.

Figure 10:
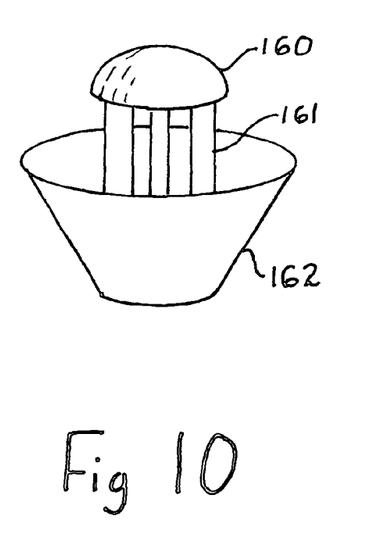
FIG. 10 sets forth a perspective view of a domed shaped valve plug.

FIG. 10 sets forth a perspective view of an alternate valve cap generally referenced by numeral 160. Valve cap 160 illustrates the use of alternatively shaped valve cap surfaces. Thus, the domed shape of valve cap 160 provides a sloped surface on which material may slide downwardly. It will be apparent to those skilled in the art that other sloping surfaces may be used without departing from the invention. Valve cap 160 is supported by a valve slide 161 upon a funnel member 162 and will be understood to function in the same manner as valve cap 40 seen above in FIG. 3.

Figure 11:
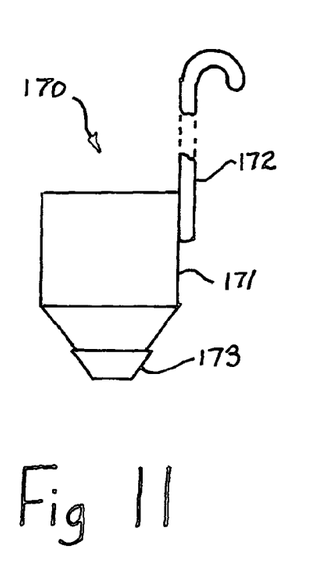
FIG. 11 sets forth a side elevation view of a still further alternate embodiment of the present invention combination scoop and funnel apparatus having a generally laddie type handle secured to the material body.

FIG. 11 sets forth a side elevation view of a still further embodiment of the present invention combination scoop and funnel generally referenced by numeral 170. Combination scoop and funnel 170 includes a material body 171 and funnel member 173 all of which is substantially identical to combination scoop and funnel 10 set forth above in FIG. 1 with the exception of handle 172. Handle 172 provides a ladle type handle which is more easily used in some types of containers.

It will be apparent to those skilled in the art that the present invention combination scoop and funnel provides substantial advantage when used as described above for exercise and fitness supplements. It will be understood, however, that the present invention device is also useable in the measuring and combining of virtually any dry or granular material with a liquid. Thus, other beverages such as those marketed under the trademarks TANG, or GATORADE or various infant formulae other drinks may be made using the present invention combination scoop and funnel. In addition, as mentioned above, the present invention combination scoop and funnel may be configured in its valve-closed configuration (shown in FIG. 3) and used as a conventional scoop to transfer dry material to a liquid.

What has been shown is a combination scoop and funnel apparatus which may be utilized in easily and conveniently transferring a measured quantity of dry material to a conventional water bottle without resort to a funnel and without the mess and spillage which normally attends this process.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A combination scoop and funnel comprising:
   a scoop having a material body defining an open top, a handle extending from said material body, an interior material reservoir and a narrowing portion extending downwardly from said material body and defining a discharge aperture;
   a funnel member having a tapered body, an open top and a funnel aperture;
   a valve slide having a lower end joined to said funnel member, an upper end extending through said discharge aperture and detent means; and
   a valve cap, defining a maximum dimension greater than said discharge aperture, supported upon said upper end of said valve slide above said discharge aperture,
   said valve slide being movable between a raised position in which said valve cap is raised upwardly away from said discharge aperture and said funnel member is proximate to said narrowing portion and a lowered position in which said valve cap blocks and closes said discharge aperture and said funnel member is spaced from said narrowing portion,
   said valve slide moved to said lowered position, and being releasably secured at said lowered position by said detent means, closing said discharge aperture to retain material scooped into said interior material reservoir and thereafter raised to open said discharge aperture and allow material to fall through said discharge aperture and said funnel aperture.

2. The combination scoop and funnel set forth in claim 1 wherein said slide includes a plurality of elongated vanes each having a lower end joined to said funnel member and an upper end joined to said valve cap, said vanes being spaced-apart to provide material flow spaces therebetween.

3. The combination scoop and funnel set forth in claim 2 wherein said detent means includes a plurality of detent projections extending outwardly from said vanes.

4. The combination scoop and funnel set forth in claim 3 wherein said valve cap defines an outer surface that tapers inwardly and upwardly.

5. The combination scoop and funnel set forth in claim 4 wherein said material body is substantially cylindrical and said lower portion is substantially frusto-conical.

6. The combination scoop and funnel set forth in claim 5 wherein said funnel member is substantially frusto-conical.

7. The combination scoop and funnel set forth in claim 6 wherein said valve cap is substantially conical.

8. The combination scoop and funnel set forth in claim 4 wherein said material body and said lower portion are faceted.

9. The combination scoop and funnel set forth in claim 8 wherein said funnel member is faceted.

10. A combination scoop and funnel comprising:
    a scoop having a material body defining an open top, an interior material reservoir and a narrowing portion extending downwardly from said material body and defining a discharge aperture;
    a funnel member having a tapered body, an open top, a plurality of outwardly extending grip tabs and a funnel aperture;
    a valve slide having a lower end joined to said funnel member and an upper end extending through said discharge aperture; and
    a valve cap, defining a maximum dimension greater than said discharge aperture, supported upon said upper end of said valve slide above said discharge aperture,
    said valve slide being movable between a raised position in which said valve cap is raised upwardly away from said discharge aperture and said funnel member is proximate to said narrowing portion and a lowered position in which said valve cap blocks and closes said discharge aperture and said funnel member is spaced from said narrowing portion,
    said slide moved to said lowered position closing said discharge aperture to retain material scooped into said interior material reservoir and thereafter raised to open said discharge aperture and allow material to fall through said discharge aperture and said funnel aperture.

* * * * *